United States Patent [19]

Orrhammar

[11] Patent Number: 4,604,712

[45] Date of Patent: Aug. 5, 1986

[54] APPARATUS FOR CONTROLLING REPRODUCTION OF TEXT CHARACTERS WHOSE FORM DEPENDS ON ADJACENCY OF OTHER CHARACTERS

[75] Inventor: Hans Orrhammar, Grottaferrata, Italy

[73] Assignee: Agence Spatiale Europeenne, Paris, France

[21] Appl. No.: 461,032

[22] Filed: Jan. 26, 1983

[30] Foreign Application Priority Data

Jan. 27, 1982 [BE] Belgium ............................ 01207149

[51] Int. Cl.⁴ ........................ G06F 3/14; G06K 15/00; B41J 5/00; G09G 9/30

[52] U.S. Cl. ...................................... 364/900; 178/30; 364/419; 364/518; 400/111; 340/732; 340/799; 340/800; 101/93.04

[58] Field of Search ... 364/200 MS File, 900 MS File, 364/419, 521, 518; 400/109-111, 484, 904, 323.1; 340/732, 799, 800; 178/30; 101/93.04, 93.09, 93.2

[56] References Cited

U.S. PATENT DOCUMENTS

| | | | |
|---|---|---|---|
| 3,998,310 | 12/1976 | Chaudhry | 400/484 |
| 4,137,425 | 1/1979 | Ferroglio et al. | 178/30 |
| 4,150,902 | 4/1979 | Brescia | 400/17 |
| 4,176,974 | 12/1979 | Bishai et al. | 400/111 |
| 4,204,089 | 5/1980 | Key et al. | 178/30 |
| 4,289,411 | 9/1981 | Cornelius et al. | 400/126 |
| 4,298,773 | 11/1981 | Diab | 178/30 |
| 4,310,840 | 1/1982 | Williams et al. | 340/724 |
| 4,359,286 | 11/1982 | Barnes | 400/70 |
| 4,400,697 | 8/1983 | Currie et al. | 340/711 |
| 4,408,199 | 10/1983 | White et al. | 340/731 |
| 4,415,766 | 11/1983 | Hyder | 178/30 |
| 4,454,592 | 6/1984 | Cason et al. | 364/900 |
| 4,505,602 | 3/1985 | Wong | 400/110 |
| 4,507,734 | 3/1985 | Kaldas | 364/419 |
| 4,511,267 | 4/1985 | Pokorny et al. | 400/110 |
| 4,527,919 | 7/1985 | Aoun | 400/111 |

FOREIGN PATENT DOCUMENTS

| | | | |
|---|---|---|---|
| 176167A | 10/1982 | Japan | 400/111 |
| 56-60621 | 10/1982 | Japan | 400/111 |

OTHER PUBLICATIONS

M. Ismail, *System for Generating Rastered Arabic Characters,* IBM Tech. Discl. Bull., (vol. 26, No. 7A, Dec. 1983), pp. 3265-3266.

C. G. Warnecke, *Mixed Left-Right, Right-Left Display,* IBM Tech. Discl. Bull. (vol. 24, No. 8, Jan. 1982), pp. 4305-4307.

C. F. Johnson, *Automatic Number Print Function for an Electronic Bidirectional Typewriter,* IBM Tech. Discl. Bull. (vol. 24, No. 4, Sep. 1981), pp. 1832-1833.

C. F. Johnson, *Modified "Mixed Text" Function for Electronic Typewriter,* IBM Tech. Discl. Bull., (vol. 24, No. 4, Sep. 1981), pp. 1829-1831.

J. M. Dunn et al., *Enhanced Foreign Language Character Set,* IBM Technical Disclosure Bulletin, (vol. 22, No. 7, Dec. 1979), pp. 2638-2640.

*Primary Examiner*—James D. Thomas
*Assistant Examiner*—A. Williams
*Attorney, Agent, or Firm*—Kramer and Brufsky

[57] ABSTRACT

A digital control device is used with a character generator for producing text in a typescript having multiform characters, such as Arabic script. The character generator includes a character store with a base page section to store codes identifying the base body of the characters and at least one additional page section to store codes identifying special character forms. The control device is arranged to register and process the incoming character identification codes to produce a control signal having a first state to enable a final address code to be produced to address the base page section in the character store and having a second state to enable a final address code to be produced to address the additional page section in the character store.

2 Claims, 9 Drawing Figures

APPARATUS FOR CONTROLLING REPRODUCTION OF TEXT CHARACTERS WHOSE FORM DEPENDS ON ADJACENCY OF OTHER CHARACTERS

BACKGROUND OF THE INVENTION

The present invention relates to an apparatus for controlling the graphic or visual representation of the characters forming the words of a text in a type script using characters which have several possible graphic forms, e.g. a text in Arabic script.

The reproduction of an Arabic text involves a fundamental problem due to the fact that each Arabic character has several different graphic forms depending on its position in a word: an initial form when the character is the first character in the word, a medial form when the character is located between two adjacent characters, a final form when the character is the last character in the word and an isolated form when the character is not connected to other characters in the word. The table of FIG. 1 shows the different character forms in the classical Arabic alphabet. The latter comprises twenty-eight consonants, a number of vowel signs and some other orthographic signs. The classical Arabic script thus comprises a number of characters much exceeding the number of Latin characters used in the western scripts. Now the usual western typesetting technology cannot cope with such a high number of Arabic characters. For this reason it has been the usual practice in the printed Arabic texts to use the consonants and some long-vowel signs only and to neglect the short-vowel signs. This makes the Arabic texts unclear or at least ambiguous with the result that their understanding is uneasy and inaccurate. Such inaccuracy is incompatible with the reproduction of technical texts and practically impedes the standardized Arabianization of the technical terms.

A major problem to be solved is to make the reproduction of technical texts in Arabic typescript and the standardized Arabianization of the technical terms possible. The resolution of this problem is of prime importance to make the developments in advanced technology accessible to the Arabian peoples and to make the technological development possible in the Arabian countries.

A further problem with the Arabic texts concerns their transmission on telecommunication lines with a view to feed data terminal units. Up to now the binary words for the transmission of Arabic characters have required ten or eleven bits and a high resolution dot display matrix, which is expensive in operation and data processing time and in memory locations.

SUMMARY OF THE INVENTION

This invention aims at providing a rational and inexpensive technical solution to solve the above mentioned problems.

A first object of the invention is to provide a digital apparatus for controlling fast and accurately the graphic or visual representation of characters from digital identification codes in accordance with the calligraphic rules of a usual alphabet, for instance the Arabic alphabet.

A further object of the invention is to provide an intelligent control apparatus for the direct control of a current display unit with a view to achieve the accurate and direct display of characters, e.g. Arabic characters.

Yet another object of the invention is to provide a display control apparatus for data terminal units with a view to enable texts written in any character script, e.g. Arabic character or the like, to be directly displayed at an online data terminal unit which is compatible with any current Latin-character data terminal unit.

In accordance with this invention the control apparatus comprises a character generator and a digital control device. The character generator includes a character store comprising a base page section serving to store codes identifying the base body of the characters and at least one additional page section serving to store codes identifying special forms of characters. The digital control device comprises first means to accept and buffer the character identification codes, second logic means responsive to the character identifying codes and arranged to produce a first control signal having a first state for addressing the base page section in the character store and a distinct state for addressing each respective additional page in said store and further arranged to produce at least a second control signal for an outer graphic representation device with a view to enable there the addition of a supplementary sign (tail, junction line) to the base body of the character identified in the base page section of the character store, and third means responsive to the character identifying codes from the first means and to the first control signal from the second logic means to produce an address signal for the character store.

In a particular embodiment the digital control device is realized in the form of a separate unit to be connected to a character generator unit used to drive a character representation or display apparatus.

BRIEF DESCRIPTION OF THE DRAWINGS

An exemplary embodiment is described hereinafter with reference to the accompanying drawings in which.

DESCRIPTION OF AN EXEMPLARY EMBODIMENT

Figure 2:
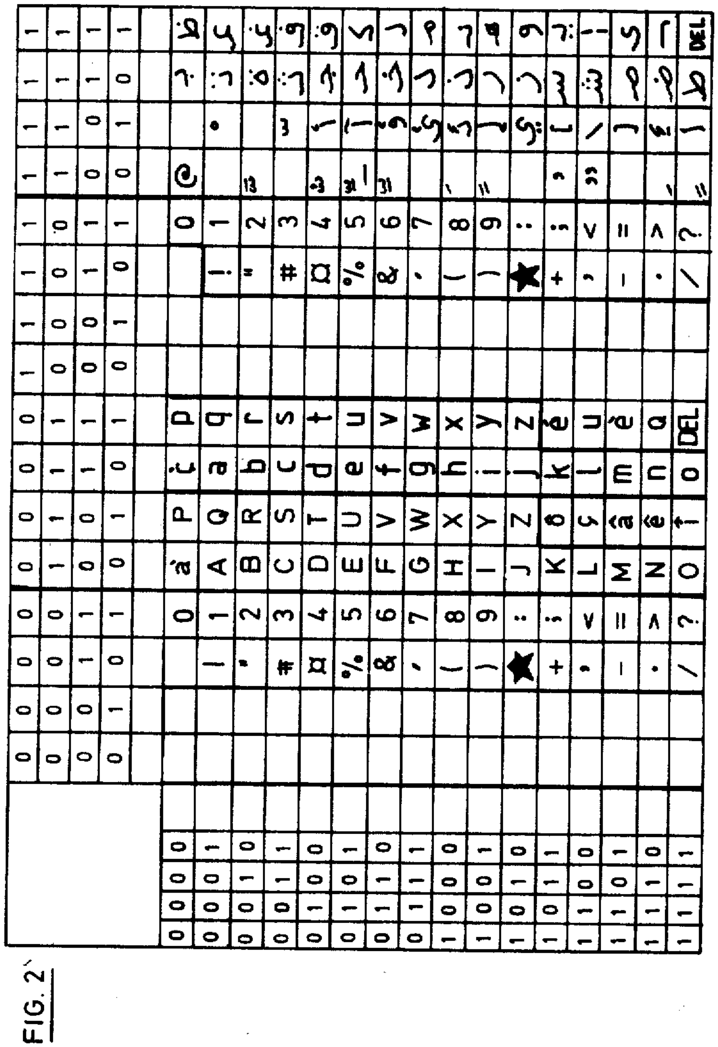
FIG. 2 is a table showing the universal standardized Arabic alphabet CODAR-U together with the standardized binary transmission codes.

The preferred embodiment of this invention is designed for the reproduction of the characters of the universal standardized Arabic alphabet CODAR-U settled by Professor Lakhdar. In this simplified alphabet the setting out of the Arabic characters is standardized and the number of characters is reduced such that the Arabic character font is comparable with the Latin character font and also consistent with the modern typewriting and telecommunication techniques. The CODAR-U alphabet is represented in the right portion of table of FIG. 2. This table also shows the Latin characters and at the top and left side of the table the standardized binary identification codes recommended for the transmission of said characters on data telecommunication lines.

Figure 3:
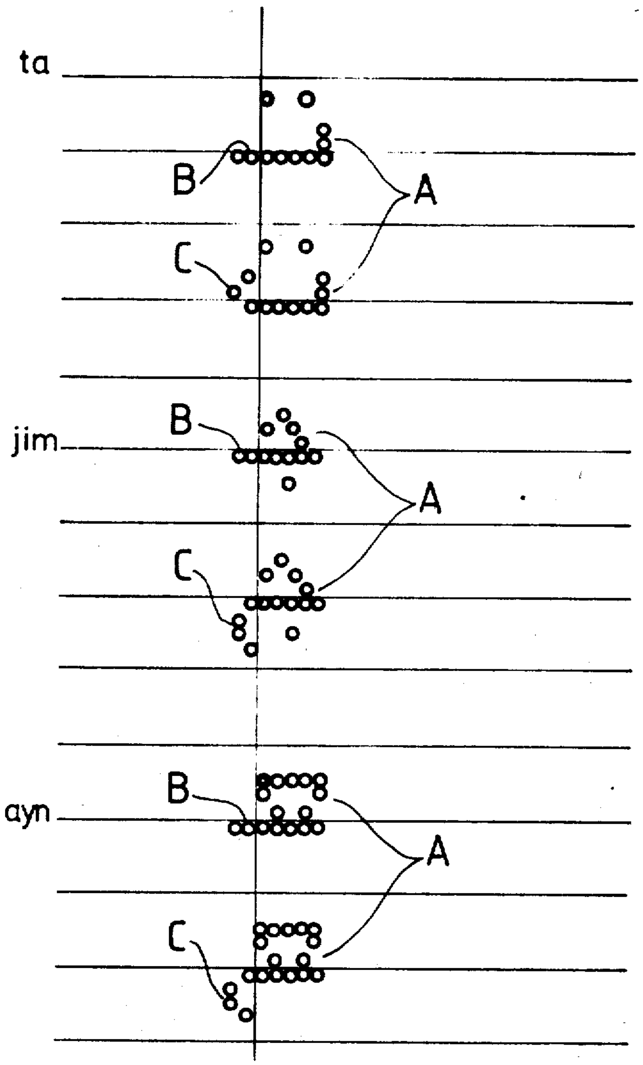
FIG. 3 illustrates the standardized representation of three exemplary Arabic characters used in an embodiment of the invention.

In the preferred embodiment described herein, the Arabic characters are subdivised into two groups. The first group comprises the characters which have constant body supplemented by either a junction line when the next character (character located at the left of the character considered) is a junction-type Arabic character or a tail when the next character is a not-junction-type character or is a non-Arabic character. FIG. 3 illustrates the standardized representation of three exemplary characters belonging to this first group: the characters ta, jim and ayn which correspond respectively to the characters Nos. 3, 5 and 18 in the table of FIG. 1. For each character illustrated in FIG. 3 there are shown two representations: the upper one shows the constant body labelled A with a junction line labelled B, the lower representation shows the constant body A with a tail labelled C.

The second group of characters comprises the characters which have not a constant body but have some special form(s) (e.g. the characters Nos. 19,26,28,36 in FIG. 1) and the possible two-level ligatures, e.g. the ligature called lam-alif which is the combination of the characters lam (No. 23) and alif (No. 1).

Figure 4:
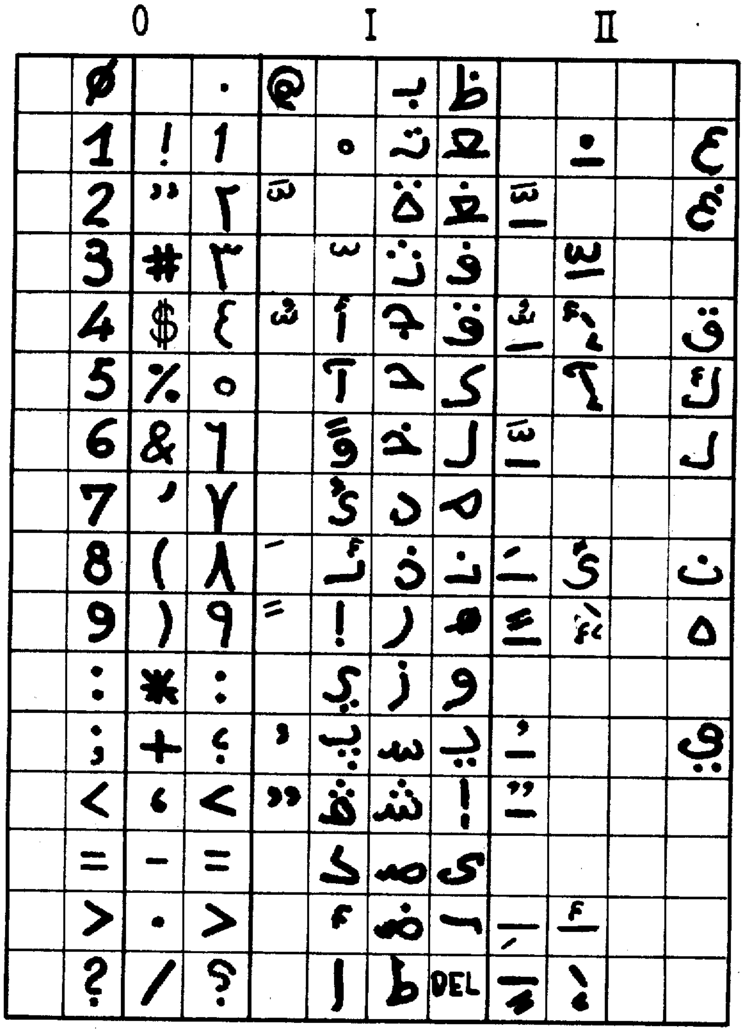
FIG. 4 shows an exemplary typical arrangement for the character store in the apparatus of the invention.
Figure 8:
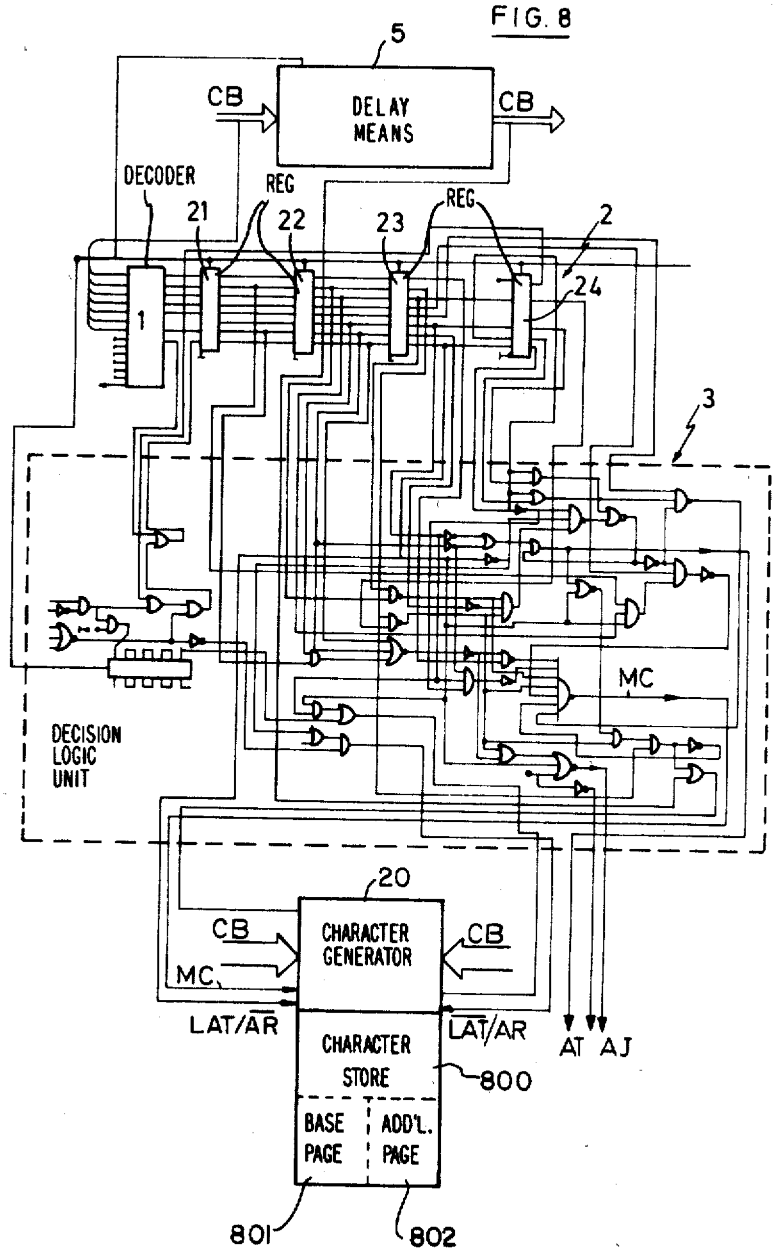
FIG. 8 is a circuit diagram of an exemplary embodiment of the apparatus according to the invention.

In accordance with this invention, the characters of the first group together with the vowel signs form a base page section 801 in a character store 800 or memory of a character generator (see FIG. 8). The other characters are contained in one or several additional page sections 802 in the memory or character store 800. FIG. 4 shows a typical exemplary memory organization in accordance with this invention: section O contains the Arabic numerals, the Indian numerals and some usual symbols, section I contains the characters and signs forming the said base page section and section II is an exemplary additional page section containing vowel signs with junction line, some special character forms and the most usual ligature lam-alif.

Each character in the base page has assigned a respective identification code to it and the apparatus according to the invention is organized to process said character codes and to determine, for each character to be reproduced, whether the character should be reproduced either in a modular representation based on a constant body as explained earlier herein with reference to FIG. 3 or should be represented in a special form.

Said determination is automatically performed in the apparatus according to the invention for each character while taking account of the position of said character in the word to be reproduced and taking account of the adjacent characters in the word. More particularly, in its embodiment designed for the Arabic characters the apparatus of the invention is organized to store, process and take into account at every time the identification of four succeeding characters and to define the correct representation form for each character to be reproduced depending on the preceeding character (i.e. the character located at the right of the character considered) and on the two succeeding characters (i.e. the characters located at the left of the character considered). In the following, the four succeeding characters which are stored will be called respectively past character, present character, future character and remote future character.

Figure 5:
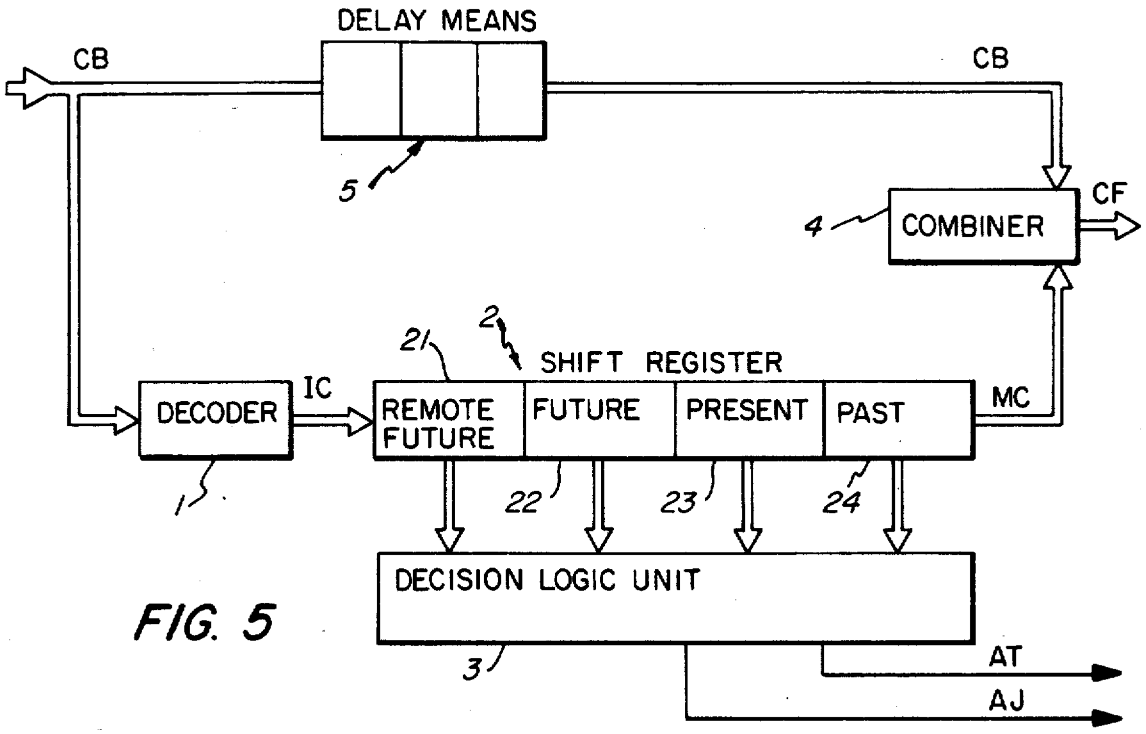
FIG. 5 is a schematic diagram of the architecture of the apparatus according to the invention.

Now the architecture of the apparatus of this invention will be described with reference to FIG. 5. The apparatus is comprised of a digital control device to control a character generator known per se in order to produce the electric signals for hitting a display device or the like, for instance a 7×9 dot matrix display device. The digital control device comprises a decoder 1, a shift register 2, a decision logic unit 3 and a combiner device 4. The input to the control device is to be connected to a binary data line from a memory or a keyboard for instance or to a data communication line capable of transmitting seven bits, e.g. an ASCII international code. The character identification codes CB of the characters to be reproduced are successively accepted by the decoder 1 and the latter is organized using known means with a view to produce category signals IC, each designating the category of the character identified by the incoming base address code CB.

Knowing that in the words written in Arabic script there are characters which are connected with the adjacent characters and other characters which are not, and also knowing that there exist combinations of characters called ligatures, e.g. the usual ligature lam-alif, then the decoder 1, in a particular embodiment, is arranged to produce the following character categories: Arabic character, constant-body Arabic character, junction-type Arabic character, character lam, character alif, ligature lam-alif, vowel sign.

The category signals IC of the succeeding characters are successively loaded into the shift register 2 having four stages 21,22,23,24. When all four stages are loaded, these stages contain, from right to left, the category signals of the following characters: the past character, the present character, the future character, the remote future character. The contents of these four stages are applied in parallel to the input of the decision logic 3.

The purpose of the decision logic is to continuously monitor the contents of the shift register stages in order to determine the accurate representation of the present character, i.e. the character which is identified in stage 23 of the shift register 2, while taking account of the categories of the next characters identified in the stages 21, 22 and 24. More particularly, the decision logic 3 is organized to respond to the contents of stages 21, 22 and 24 in register 2 in order to produce three control signals serving to determine accurately the visual representation of the present character: a first control signal MC to indicate whether the base address code CB should be altered or not, a second termination enable signal AT to enable the addition of an appendix or supplementary sign (tail or junction line) to the constant body of the character in accordance with the modular representation as discussed hereinbefore with reference to FIG. 3, and a junction bar enable signal AJ to enable the addition of a junction bar supplementary to a vowel sign.

The first control signal MC has two states. The first state indicates that the base code of the present character has not to be altered, that is to say that said present character belongs to the character group stored in the base page section of the character store (section I in the table of FIG. 4). The second state indicates that the base code of the present character has to be altered, that is to say that the present character belongs to the character category as stored in the additional page section of the character store (section II in the table of FIG. 4).

The decision logic 3 in accordance with this invention can be implemented by a suitable arrangement of logic circuit means known per se or by any functionally equivalent software or firmware process organization capable of performing the various required functions as described hereafter.

The control signal MC is combined in the combiner device 4 with the base code CB to form the final address code CF of the character to be reproduced. Prior to being combined with the control signal MC, the incoming base code CB is delayed in delay means 5 having a number of stages equal to the number of stages in register 2 between the input thereto and the stage 23 which identifies the present character. In the described embodiment said stages in the delay means 5 are three in number.

In a particular embodiment designed for two character groups like groups I and II in the table of FIG. 4, the combiner device 4 consists of a logic device arranged to alter the binary state of one bit in the base code CB in response to the control signal MC thereby to produce the final code CF of the character to be reproduced. In a more general embodiment the combiner device 4 can be a binary adder serving in a manner known per se to add the base code CB and a control signal MC in a suitable binary format with a view to designate any one of a plurality of additional page sections (802) in the character store (800) as explained herein.

When the control signal MC is in its first state, the combiner device 4 produces a final code CF which is identical to the incoming base code CB: it addresses the base section (801) in the character store (800) and the character is then reproduced in the modular representation according to this invention (see FIG. 3). The final code CF identifies the base body of the character while the enable signals AT and AJ from the decision logic 3 (FIG. 5) control the addition of the appendix sign by indicating whether the base body should be supplemented by a tail or a junction line. When the control signal MC is in its second state, the combiner device 4 produces a final code CF to address the additional page section (802) in the character store (800) and to identify therein a special form for the character to be reproduced.

Figure 7:
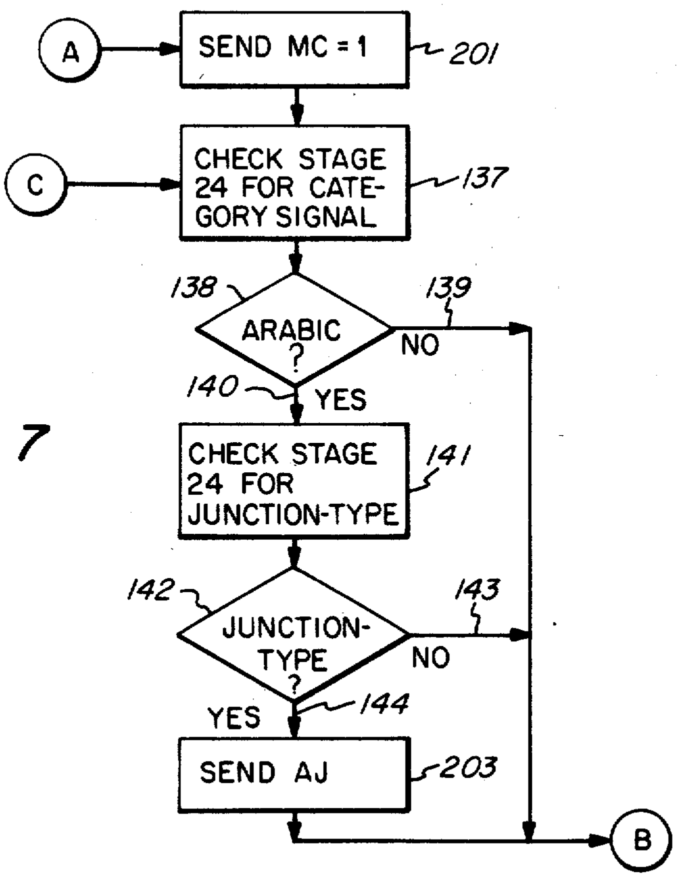
FIG. 7 is a flow-diagram of a portion of the operation process illustrated by the flow-diagram of FIG. 6.
Figure 6A:
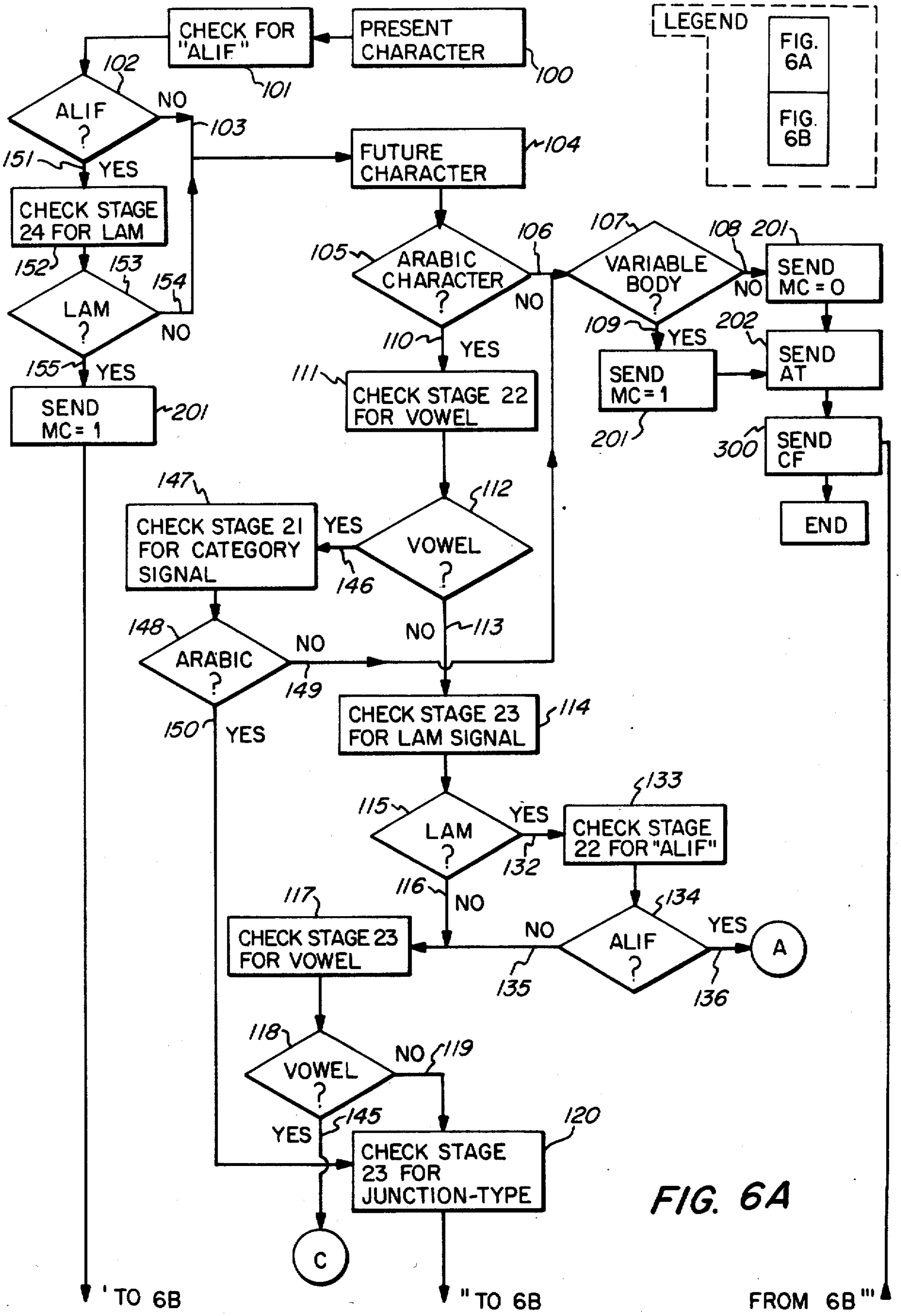
FIGS. 6A and 6B (hereinafter referred to as FIG. 6) are a flow-diagram of the operation of the decision logic means incorporated in the apparatus of the invention.
Figure 6B:
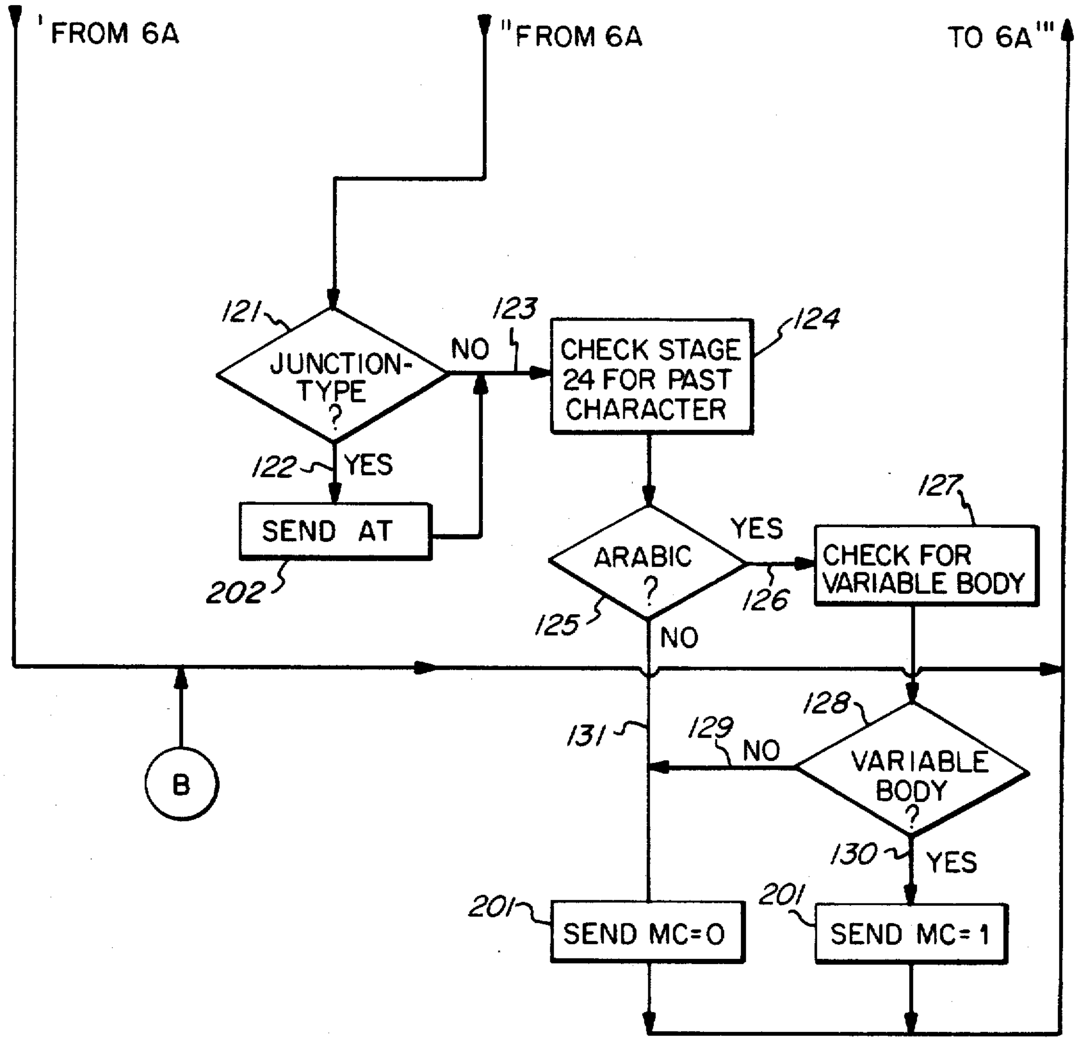

From the foregoing it is apparent that the decision logic 3 constitutes the heat of the control apparatus of the invention. The function of said decision logic, as explained earlier herein, is to determine the accurate reproduction of the present character (i.e. the character which is identified in stage 23 of register 2) when taking account of the characters identified in the stages 21, 22 and 24 of register 2. For that purpose the decision logic 3 continuously monitors the category identification signals IC for the succeeding four characters identified in register 2 and it performs an operational process illustrated by the flow-diagrams of FIGS. 6 and 7. The graphic symbols used in these flow-diagrams are standardized symbols conventionally used in logic flow-diagrams. FIG. 7 illustrates an operation sequence, the input and output points of which (represented by circled letters) are branch points in the process illustrated in FIG. 6. The various steps in the process are designated by reference numerals which are recited herebelow.

The decision logic 3 is organized to perform the following determinations based on the category identification signals loaded into the stages of register 2:

100 the present character (stage 23 in register 2) is an Arabic character
101 check for the "alif" signal in stage 23
102 is the present character the character alif?
103 the present character is not a character alif
104 check for the future character category (stage 22 in register 2)
105 is the future character an Arabic character?
106 the future character is not an Arabic character
107 is the present character a variable body character?
108 the present character is not a variable body character
201 send control signal MC in stage O
202 send enable signal AT
300 send base address code CF
109 the present character is a variable body character
201 send control signal MC in state 1 and
300 send altered address code CF
110 the future character is an Arabic character
111 check for the vowel signal in stage 22
112 is the future character a vowel sign?
113 the future character is not a vowel sign
114 check for the "lam" signal in stage 23
115 is the present character a character lam?
116 the present character is not a character lam
117 check for the vowel signal in stage 23
118 is the present character a vowel sign?
119 the present character is not a vowel sign
120 check for the junction-type signal in stage 23
121 is the present character a junction-type character?
122 the present character is a junction-type character
202 send enable signal AT
123 the present character is not a junction-type character
124 check for the past character category (stage 24 in register 2)
125 is the past character an Arabic character?
126 the past character is an Arabic character
127 check for the variable body character signal in stage 24
128 is the past character a variable body character?
129 the past character is not a variable body character
201 send control signal MC in state O and
300 send base address code CF
130 the past character is a variable body character
201 send control signal MC in state 1
300 send altered address code CF to address the additional page section in the character store
131 the past character is not an Arabic character
201 send control signal MC in state O
300 send base address code CF
132 the present character is the character lam
133 check for the "alif" signal in stage 22 (future character)
134 is the future character the character alif?
135 the future character is not a character alif: proceed further from 117
136 the future character is a character alif
201 send control signal MC in state 1
137 check for the category signal in stage 24 (past character)
138 is the past character an Arabic character?
139 the past character is not an Arabic character
300 send altered address code CF
140 the past character is an Arabic character
141 check for the junction-type signal in stage 24
142 is the past character a junction-type character?
143 the past character is not a junction-type character 300 send altered address code CF
144 the past character is a junction-type character
203 send enable signal AJ
300 send altered address code CF
145 the present character is a vowel sign: proceed further from 137
146 the future character is a vowel sign
147 check for the category signal in stage 21 (remote future character)
148 is the remote character an Arabic character?
149 the remote future character is not an Arabic character: proceed further from 107
150 the remote future character is an Arabic character: proceed further from 120
151 the present character is a character alif
152 check for the "lam" signal in stage 24 (past character)
153 is the past character a character lam?
154 the past character is not a character lam: proceed further from 104
155 the past character is a character lam
201 send control signal MC in state 1
300 send altered address code CF In order to illustrate the operation of the control apparatus according to the invention let us consider for instance the word ISLAM which, in Arabic script, is normally written as follows:

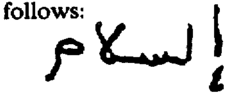

Figure 1:
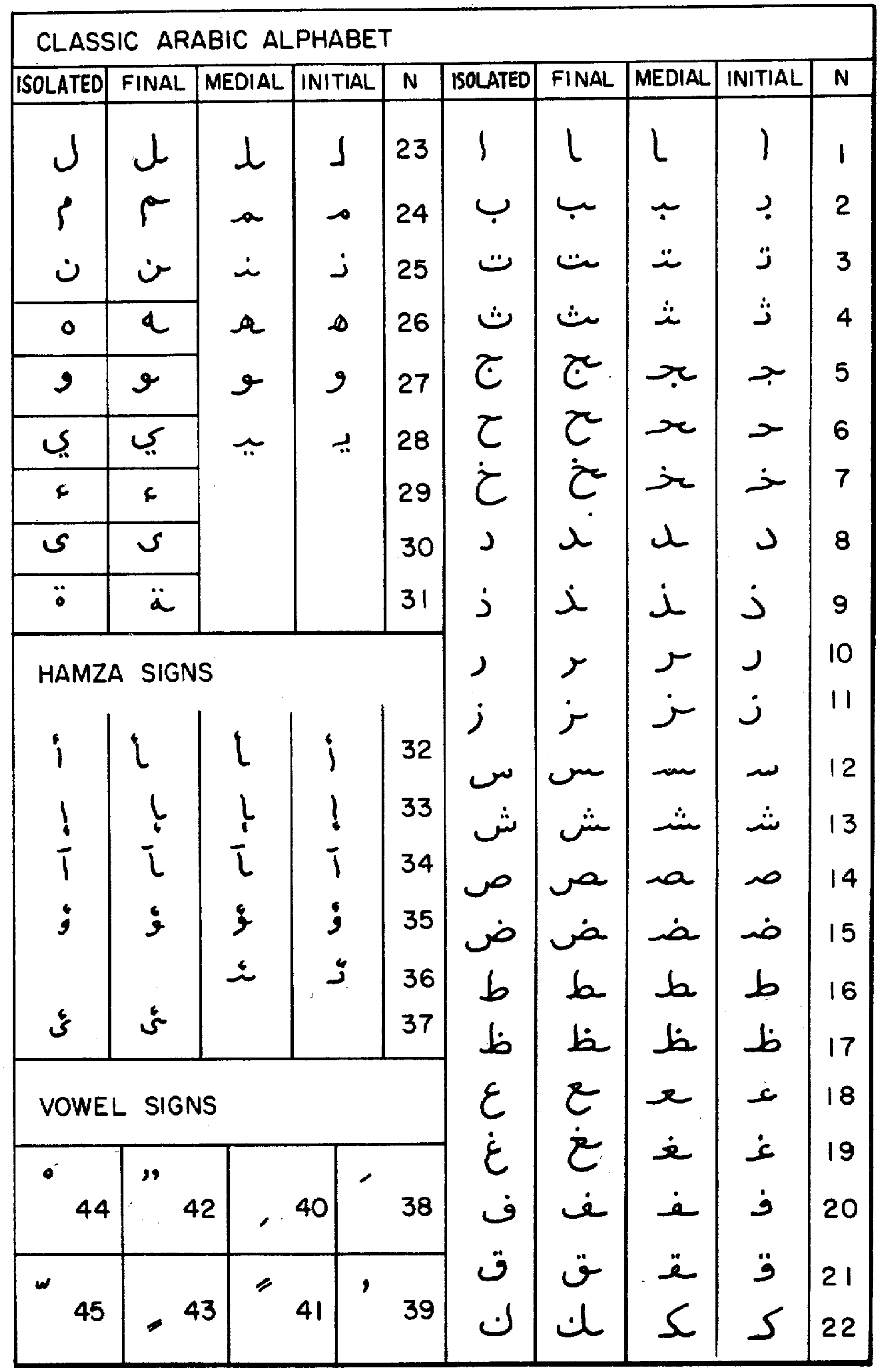
FIG. 1 is a table showing the classical Arabic alphabet.

This word is composed of six characters namely (from right to left) the characters Nos. 33, 23, 12, 23, 1 and 24 in the table of FIG. 1. One notices that the first and last characters are isolated and that the remaining characters are connected to each other. One notices further that the fourth and fifth characters form the ligature lam-alif. As the base codes for these six characters are entered into the control apparatus (FIG. 5), the category signals IC are loaded successively into the shift register 2 and the decision logic 3 determines the graphic form of each character identified by the category signals in stage 23 of the shift register 2. When performing the determination process as described hereinbefore, the decision logic 3 detects the category signals IC for each character, which results in the following synopsis:

the first character is not connected to the next character and is thus followed by a space (non Arabic character),
the second and third characters are interconnected,
the fourth character forms a ligature with the fifth character and it is also connected to the third character by a junction line,
the fifth character is followed by a space (non Arabic character),
the sixth character is preceeded by a space and is supplemented by a tail.

For these six characters the decision logic 3 successively produces the following control and enable signals:

For the first character:
a signal MC with a view to produce a final code CF to address the base page section (801) in character store (800), For the second character:
a signal MC with a view to produce a final code CF to address the base page section (801) in character store (800) and an enable signal AT to enable the addition of a junction line to supplement the base body, For the third character:
a signal MC with a view to produce a final code CF to address the base page section (801) in character store (800) and an enable signal AJ to enable the addition of a junction line between the base body and the fourth character, For the fourth character:
a signal MC with a view to produce a final code CF (altered address code) to address the additional page section (802) in character store (800) so as to select therein the ligature character (lam-alif) for the ligature with the fifth character, For the fifth character:
same signals as for the fourth character, For the sixth character:
a signal MC with a view to produce a final code CF to address the base page section (801) in the character store (800) together with an enable signal AT to enable the addition of a tail supplementary to the base body of the character.

It should be pointed out that in the case of a vowel sign the determination process is the same as for another Arabic character and that the addition of a junction bar can be selected as it does for the ligature lam-alif (if the preceding and following characters are junction-type characters).

An exemplary embodiment of the apparatus according to the invention is shown in the schematic diagram of FIG. 8. This diagram shows a wired embodiment for the decision logic 3. The latter drives a character generator 20 including a section (controlled by the signal LAT/$\overline{\text{AR}}$ arranged to generate Arabic characters and a section (controlled by the signal $\overline{\text{LATAR}}$) arranged to generate Latin characters, digits and conventional symbols as shown in section O in the table of FIG. 4. In this exemplary embodiment, the combiner means 4 of FIG. 5 consists in a simple logic device included in the character generator unit 20 and arranged to change the binary state of one bit in the base code CB in response to a control signal MC in state 1 in order to produce the final address code CF.

It is understood that other embodiments can be implemented in order to perform the required functions of the decision logic with a view to perform the control process described in the foregoing.

What is claimed is:

1. Digital apparatus for controlling the reproduction by a graphic device of characters forming the words of a text in a typescript including characters which have several possible graphic forms depending on the adjacency of other characters, the characters being received from an external source as sequences of character identification codes, said apparatus comprising:
a character generator including a character store having a base page section for storing codes identifying the base bodies of characters and at least one additional page section for storing codes identifying forms of the characters; and
a digital control device including:
first means for accepting and buffering the character identification codes from the external source,
second means for accepting the character identification codes from the external source to produce category signals for each character to be reproduced, third means connected to receive the category signals from said second means for buffering the category signals of at least four successive characters, fourth means responsive to the category signals buffered in said third means for producing a first control signal having a first state when the identification code of the character to be reproduced is stored in the base page section of the character store and a second state when the identification code of the character to be reproduced is stored in an additional page section of said character store, and also for producing at least one second control signal for the graphic device to enable the addition of supplementary signs to a character form read out from the character store, and fifth means coupled to receive the character identification codes from the first means and said first control signal from the fourth means for producing a final character address code for the character store, thereby to select the character form to be reproduced.

2. Apparatus according to claim 1, wherein said digital control device comprises:

buffer means for accepting and buffering the character identification codes from the external source, decoder means, coupled to receive the character identification codes from the external source for producing a category signal for each character identification code, shift register means connected to the output of the decoder means to buffer the category signals of a plurality of successive characters, said shift register means comprising at least three stages, the second of which contains the category signal of the present characters, decision logic means, coupled to receive the category signals contained in all of the stages of the shift register means, for producing said first and second control signals in response to the category signals, and logic combiner means, coupled to receive each character identification code from said buffer means at a first input and to receive said first control signal from the decision logic means at a second input, for producing a final character address code to address the character store, thereby selecting the correct form of a character to be reproduced.

* * * * *